(12) United States Patent
Predtetchenski et al.

(10) Patent No.: US 8,982,520 B2
(45) Date of Patent: Mar. 17, 2015

(54) USB PORT OVERVOLTAGE PROTECTION

(75) Inventors: Alexei A. Predtetchenski, Austin, TX (US); Hans L. Magnusson, Austin, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 1427 days.

(21) Appl. No.: 12/364,144

(22) Filed: Feb. 2, 2009

(65) Prior Publication Data

US 2010/0073837 A1    Mar. 25, 2010

Related U.S. Application Data

(60) Provisional application No. 61/098,561, filed on Sep. 19, 2008.

(51) Int. Cl.
*H02H 3/20* (2006.01)
*G06F 13/40* (2006.01)

(52) U.S. Cl.
CPC .................................. *G06F 13/4072* (2013.01)
USPC ............................ 361/86; 361/91.5; 361/91.7

(58) Field of Classification Search
CPC ... H02M 1/34; H02M 2001/348; H02M 1/32; H03K 17/08142; H03K 17/08144; G06F 13/40726
USPC .................... 361/119, 86, 91.5, 91.7, 91.1, 88
See application file for complete search history.

(56) References Cited

U.S. PATENT DOCUMENTS

| | | | | |
|---|---|---|---|---|
| 5,946,175 | A | * | 8/1999 | Yu ..................................... 361/56 |
| 6,633,470 | B2 | | 10/2003 | Ponton et al. |
| 6,775,121 | B1 | | 8/2004 | Chaudhry |
| 7,085,117 | B2 | | 8/2006 | Bullock et al. |
| 7,190,564 | B2 | * | 3/2007 | Yunus ........................... 361/91.7 |
| 7,649,726 | B2 | | 1/2010 | Castro |
| 2006/0267606 | A1 | * | 11/2006 | Groshong et al. ............. 324/754 |
| 2008/0165457 | A1 | * | 7/2008 | Premerlani et al. ............. 361/31 |
| 2009/0109587 | A1 | * | 4/2009 | Smith et al. ...................... 361/86 |
| 2010/0169511 | A1 | * | 7/2010 | Dunstan et al. .................. 710/16 |

* cited by examiner

*Primary Examiner* — Jared Fureman
*Assistant Examiner* — Nicholas Ieva
(74) *Attorney, Agent, or Firm* — King & Spalding L.L.P.

(57) ABSTRACT

A system and method for efficient input/output (I/O) port overvoltage protection of a high-speed port. An interfacing system for connecting peripheral devices to a computing system comprises ports for conveying serial communications bi-directional signals and an overvoltage protection circuit. The protection circuit prevents an overvoltage condition on one port in response to an overvoltage event on a corresponding second port. In one embodiment, the interfacing system connects USB peripheral devices to an automotive infotainment system comprising an automotive battery potiential greater than a USB power supply. In addition, the overvoltage protection circuit is able to transmit signals between the two ports without signal attenuation defined by an industry standard specification such as Universal Serial Bus (USB) Implementers Forum (IF) eye pattern diagram test. The overvoltage protection circuit is configured to have a small footprint, and, therefore, does not utilize a power reference and comparator circuit.

20 Claims, 3 Drawing Sheets

# USB PORT OVERVOLTAGE PROTECTION

This application claims priority to Provisional Patent Application Ser. No. 61/098,561 filed Sep. 19, 2008, and entitled "USB Port Overvoltage Protection", which is hereby incorporated by reference in its entirety.

BACKGROUND OF THE INVENTION

1. Field of the Invention

This invention relates to electronic circuits, and more particularly, to an efficient method of input/output (I/O) port overvoltage protection of a high-speed port.

2. Description of the Relevant Art

A Universal Serial Bus (USB) is a standard serial bus interface for connecting devices, such as multiple computer peripherals or portable music and video players, to a host computer for easy transfer of data by means of hot swapping, or allowing devices to be connected and disconnected without a need to reboot the computer or to turn off the device. This means of connecting is also referred to as hot plugging. USB allows several devices to be used without requiring manufacturer-specific device drivers to be installed on the host computer. The USB Implementers Forum (USB-IF), an industry trade association incorporating companies from the computer and electronics industries, standardizes the design of USB. USB is intended to replace many legacy varieties of serial and parallel ports, and for many computer peripherals, USB has become the standard connection protocol.

A USB interface is a master/slave architecture. From the frame of reference of a USB interface, the master is referred to as the "upstream" device, or host/hub, and the slave as the "downstream" device. The interface consists of four wires: D+, D−, VBUS, and Ground. The two data lines, D+ and D−, are for bi-directional data transfer and use differential drive techniques. The wires VBUS and Ground are used to distribute power from the upstream host to the downstream device. Again, the terms "upstream" and "downstream" are from the point-of-view of a particular USB interface.

USB devices are linked in series through hubs. A USB hub is a device that allows many USB devices to be connected to a single USB port on the host computer or another hub. Each hub has one upstream port and a number of downstream ports. The upstream port connects the hub (directly or through other hubs) to the host. Other hubs or devices may be attached to the downstream ports. USB hubs may be built into equipment, such as computer keyboards, computer monitors, a personal computer (PC), a smartphone, a video game console, an automotive infotainment system comprising one or more of a navigation application with real-time traffic, a hands-free communication application, and an audio/video storage and playback application; or other. Automobile manufacturers have begun to include USB ports in vehicles, such as in dashboards or center consoles, that permit the connection of USB peripheral devices to the in-vehicle entertainment system, or infotainment system. Now, a portable audio player may be allowed to play audio and to control and display functions using the vehicle's own system. Ford Motor Company's SYNC system is one example.

A system with inherent higher voltages than USB levels, such as an automotive infotainment system, introduces design issues not previously considered in industry specifications, such as the USB 2.0 Specification from the USB Implementers Forum. The original applications for USB hubs were intended primarily for connecting digital devices, or USB peripheral devices, both together and to host computers while operating at a low voltage. The maximum allowable voltage levels on the data and power lines of USB interfaces are less than the voltage levels used on lines both within automotive electronic modules and on wiring external to automotive electronic modules. For example, the USB data and power lines are typically powered up to 5V, and an automotive battery is able to supply 12V. USB lines within an automotive dashboard or center console may be destroyed in the event they are shorted to the positive potential of a 12V automotive battery. Many manufacturers of electrical automobile systems refer to the International Organization for Standardization (ISO) 7637 for defining electrical transient protection, which allows higher voltages than typical USB voltage levels.

In addition to no industry specifications addressing overvoltage protection of USB lines within systems coupled to much higher operating voltages, designs of a proposed overvoltage solution must meet several requirements. Some examples of these requirements include quick response to electrical surges and transients to maximize protection, low capacitance to minimize signal attenuation, small packages to minimize footprint for space-constrained modules, support high-speed data rate, and satisfy a USB-IF eye pattern diagram.

USB IF eye pattern diagrams may be used to diagnose signal-integrity problems that corrupt serial data in digital-communication systems. Test Points 2 and 3 of the USB 2.0 Specification addresses new manners by which generation of eye pattern diagrams for packetized data are performed. The USB 2.0 Specification describes difficult requirements to meet for overvoltage protection devices such as the rise and fall times, signal levels, and pulse skew of a corresponding eye pattern diagram. Even further, overvoltage protection of the data lines may be more difficult due to the high-speed data rate support of 480 MBits/sec for these data lines. At this speed the capacitance and inductance of the circuit board, connectors, and any additional circuitry becomes critical. These high-frequency capacitive and inductance effects make it difficult to satisfy all of the above requirements.

In view of the above, efficient methods and systems for input/output (I/O) port overvoltage protection of a peripheral device are desired.

SUMMARY OF THE INVENTION

Systems and methods for efficient input/output (I/O) port overvoltage protection of a high-speed port.

In one embodiment, an interfacing system for connecting peripheral devices to a computing system comprises ports for conveying serial communications bi-directional signals and an overvoltage protection circuit. The overvoltage protection circuit prevents an overvoltage condition on one port in response to an overvoltage event on a corresponding second port. In addition, the overvoltage protection circuit is able to transmit the bidirectional signal between the two ports without signal attenuation defined by an industry standard specification such as Universal Serial Bus (USB) Implementers Forum (IF) eye pattern diagram test. In one embodiment, the interfacing system connects USB peripheral devices to an automotive infotainment system comprising an automotive battery potiential greater than a USB power supply. The overvoltage protection circuit is configured to have a small footprint, and, therefore, does not utilize a power reference and comparator circuit.

Also contemplated is a method to protect wires and ports operating at a lower voltage level than a battery potential of an interfacing computing system. An overvoltage event on a first port is prevented from causing an overvoltage condition on a corresponding second port. In addition, the ports are configured to convey serial communications bi-directional signals with a high-speed data rate mode. The method is able to transmit these signals without signal attenuation defined by an industry standard specification such as Universal Serial Bus (USB) Implementers Forum (IF) eye pattern diagram test.

These and other embodiments will be appreciated upon reference to the following description and accompanying figures.

Figure 1:
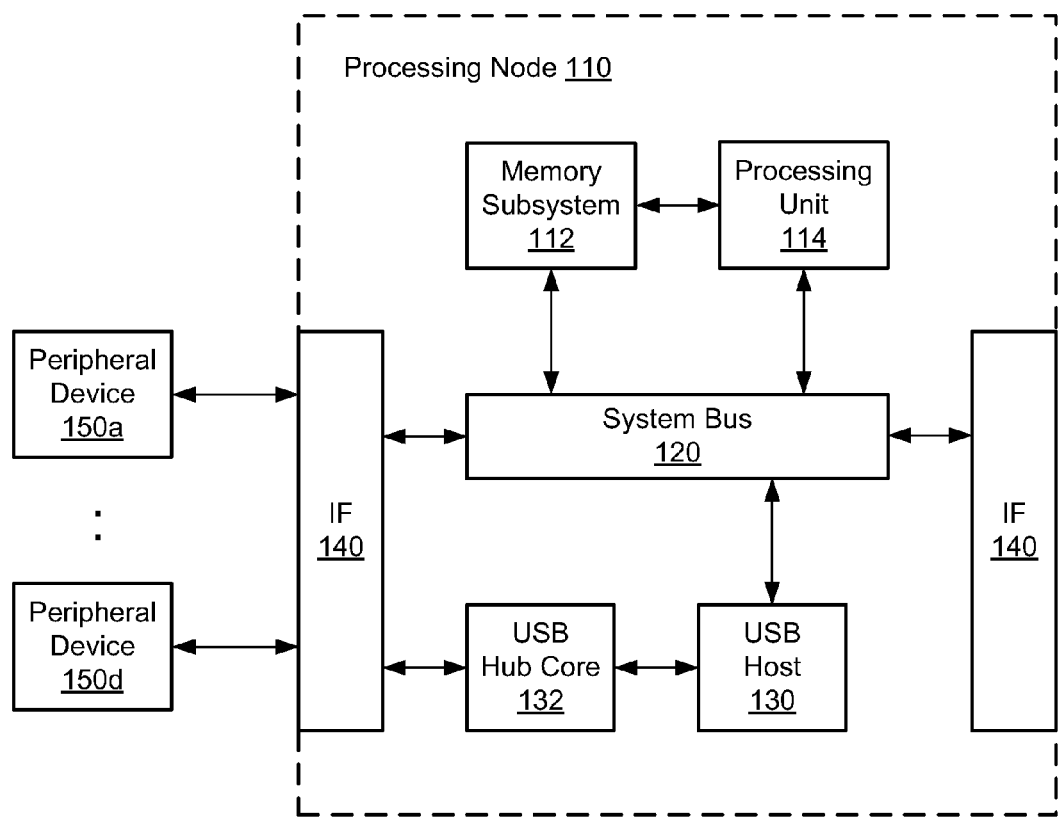
FIG. 1 is a generalized block diagram illustrating one embodiment of a computing system utilizing multiple peripheral devices.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

In the following description, numerous specific details are set forth to provide a thorough understanding of the present invention. However, one having ordinary skill in the art should recognize that the invention may be practiced without these specific details. In some instances, well-known circuits, structures, and techniques have not been shown in detail to avoid obscuring the present invention.

Referring to FIG. 1 one embodiment of a computing system 100 utilizing a data bus interface to couple multiple peripheral devices is shown. This embodiment does not include all examples of functional blocks, control logic, and interfaces required both within and outside processing node 110. In addition, computing system 100 may comprise two or more processing nodes 110. The embodiment shown is for a simple illustrative purpose.

Computing system 100 includes at least one processing node 110. In one embodiment, processing node 110 is an automotive infotainment system operating from a 12V automobile battery, wherein processing node 110 comprises one or more of a navigation application with real-time traffic, a hands-free communication application, an audio/video storage and playback application, or other. Processing node 110 may include system bus 120, processing unit 114, memory subsystem 112, interface logic 140, Universal Serial Bus (USB) host 130, and USB hub core 132. In one embodiment, the illustrated functionality of processing node 110 is incorporated upon a single integrated circuit. In other embodiments, the illustrated functionality of processing node 110 may be provided on a system-on-chip (SOC), on separate semiconductor chips on a motherboard or card, or other.

In one embodiment, processing unit 114 includes one or more processor cores, wherein each processor core includes circuitry for executing instructions according to a predefined instruction set. For example, the x86 instruction set architecture (ISA) may be selected. Alternatively, the Alpha, PowerPC, or any other instruction set architecture may be selected. Each processor core may be implemented to simultaneously execute multiple software threads of a software application. In another embodiment, processing unit 114 includes one or more application specific integrated circuits (ASICs) or microcontrollers. In addition, processing unit 114 may include one or more digital signal processors (DSPs), graphic processing units (GPUs), analog-to-digital converters (ADCs), and digital-to-analog converters (DACs). Other data processing semiconductor chip designs included within processing unit 114 are possible and contemplated. Further, physically, these data processing designs may be implemented outside of processing unit 114 for interfacing reasons, on-die routing and signal integrity reasons, or other reasons.

Generally speaking, processing unit 114 accesses memory storage for data and instructions or commands. Although not shown, it is possible an ASIC, or other data processing die, may receive a command directly from an outside source via interface 140. In one embodiment, a cache memory subsystem implemented as a L1 cache structure configured to store blocks of data, and possibly with an additional L2 cache structure, is integrated within processing unit 114. Memory subsystem 112 is implemented as a L2 or L3 cache structure and may be directly coupled to processing unit 114. If a requested block is not found in an integrated cache structure or memory subsystem 112, then a read request may be generated and transmitted to a memory controller not shown in order to access outside memory to which the missing block is mapped. Outside memory, memory subsystem 112, and any integrated memory within processing unit 114 may comprise any suitable memory devices in addition to a cache structure. For example, these memories may comprise one or more RAMBUS dynamic random access memories (DRAMs), synchronous DRAMs (SDRAMs), DRAM, static RAM, sequential storage elements such as flip-flops and latches, etc.

System bus 120 is configured to respond to control packets received on the links to which processing node 110 is coupled, to generate control packets in response to processing unit 114 and/or memory subsystems 112, to generate probe commands and response packets in response to transactions selected by a memory controller not shown, and to route packets for which node 110 is an intermediate node to other nodes through interface logic 140. Interface logic 140 may include logic to receive packets and synchronize the packets to an internal clock used by system bus 120.

Processing node 110 may be coupled to one or more peripheral devices 150a-150d. As used herein, elements referred to by a reference numeral followed by a letter may be collectively referred to by the numeral alone. For example, peripheral devices 150a-150d may be collectively referred to as peripheral devices 150. Depending on the implementation of processing node 110, peripheral devices 150 may include portable storage devices, gamepads, smartphones, personal data assistants (PDAs), portable audio/video players, cameras, or other. A peripheral device 150 may consist of several logical sub-devices that are referred to as device functions. A single peripheral device 150 may provide several functions. For example, a portable DVD player has both a video device function and built-in speakers, which is an audio device function. Other devices are contemplated to also be within the scope of the present invention. The specific type of peripheral used does not limit the invention. Peripheral devices 150 may typically operate at low voltage levels such as 5V wherein processing node 110 may be communicatively coupled to a 12V automobile battery. Should an overvoltage event occur, such as the 12V potential of the automobile battery is temporarily shorted to an input/output (I/O) port within data bus logic located in interface logic 140, then I/O port may be permanently damaged.

Typically, serial data communications, such as a Universal Serial Bus (USB), is utilized as a standard interface for connecting peripheral devices 150 to processing node 110 for easy transfer of data by means of hot swapping. In one embodiment, a USB system has an asymmetric design, consisting of a USB host 130 comprising one or more USB host controllers, a USB hub core 132 comprising a multitude of downstream USB ports, and multiple peripheral devices 150 connected in a tiered-star topology. Additional USB hubs 132 may be included in the tiers, allowing branching into a tree structure with up to five tier levels. USB devices, such as peripheral devices 150 and USB hubs 132, are linked in series through USB hubs 132. One hub, known as a root hub, may be built into a host controller within USB host 130.

A USB host 130 may have multiple host controllers and each host controller may provide one or more USB ports. USB host 130 connects a host system, such as processing node 110, to other network and storage devices, such as peripheral devices 150.

A host controller interface (HCI) is a register level interface, which allows a host controller within USB host 130 to communicate with the operating system of processing node 110. On an expansion card or motherboard controller, the HCI may include digital logic engines in Field Programmable Gate Arrays (FPGAs) in addition to analog circuitry to manage the high-speed differential signals. On the software side, the HCI may require a device driver, or a Host Controller Driver (HCD). Two modern versions of HCI include an Open Host Controller Interface (OHCI) and an Enhanced Host Controller Interface (EHCI). They are embedded in the USB host 130, which routes the differing USB speeds accordingly without user intervention. For example, in one embodiment, USB hub core 132 supports low-speed (LS) transfers, or 1.5 Mbit/s, full-speed (FS) transfers, or 12 Mbit/s, and high-speed (HS) transfers, or 480 Mbit/s. USB HS signals may introduce different circuit effects than LS or FS signals due to the behavior of capacitances coupled to corresponding data lines. These effects are discussed in more detail later.

In one embodiment, the interfaces between USB hub core 132 and both USB host 130 and interface 140 may include USB 2.0 Transceiver Macrocell Interface (UTMI) or an extended version (UTMI+). In another embodiment, the interfaces may include UTMI+ Low Pin Interface (ULPI), which is a 12-pin interface standard for connecting USB core logic to a USB transceiver. ULPI may be implemented as a wrapper around both UTMI+ and a physical layer (PHY) in order to reduce pin count in Hi-Speed (HS) USB systems.

Generally, interface logic 140 may comprise buffers for receiving packets from an outside link and for buffering packets to be transmitted upon the link. Computing system 100 may employ any suitable flow control mechanism for transmitting data. Interface logic 140 may include a physical layer (PHY), which may be integrated into most USB systems in order to provide a bridge between the digital and modulated parts of the interface. A PHY connects a link layer device to a physical medium such as an optical fibre or copper cable. A PHY typically includes a Physical Coding Sublayer (PCS) and a Physical Medium Dependent (PMD) sublayer. The PCS encodes and decodes the data that is transmitted and received. The purpose of the encoding is to make it easier for the receiver to recover the signal. The PMD consists of a transceiver for the physical medium.

Figure 2:
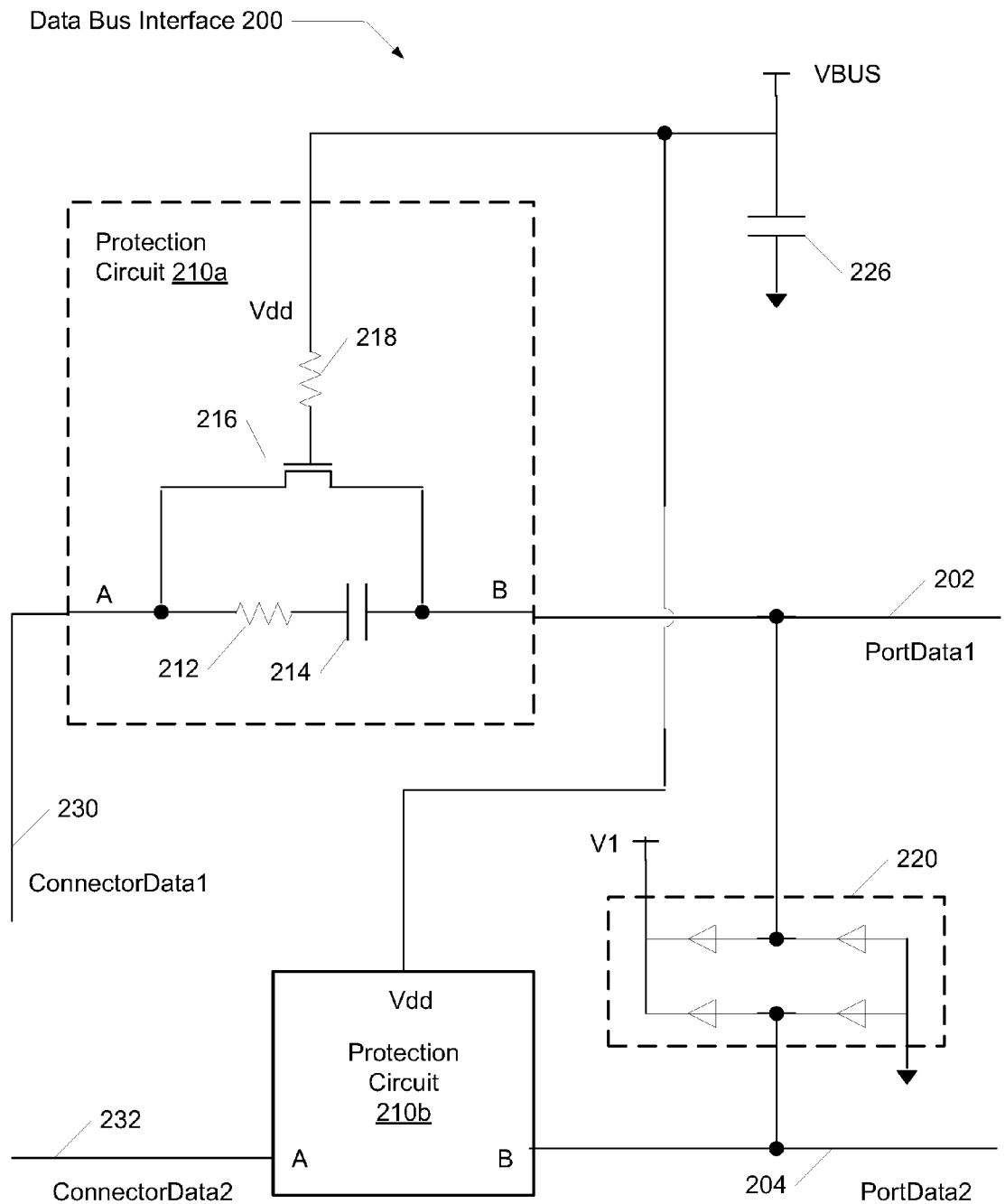
FIG. 2 is a generalized block diagram illustrating one embodiment of a data bus interface with an overvoltage protection circuit.

Turning now to FIG. 2, one embodiment of a data bus interface with an overvoltage protection circuit connected to a high-voltage system is shown. In the embodiment shown, and referring again to FIG. 1, a USB peripheral device 150 may be connected to an automotive infotainment system such as processing node 110 via an interface, such as interface logic 140.

In one embodiment, a peripheral device's power line, or VBUS, Ground, and two data lines, D+ and D−, are connected to corresponding lines within interface logic 140 that couple these signals to a downstream port of a USB hub. For example, a portable media player may be plugged-in to a USB receptacle in a dashboard of an automobile. The D+ data line of the portable media player may be coupled to ConnectorData1 230 in FIG. 2. The corresponding D− data line of the portable media player may be coupled to ConnectorData2 232 in FIG. 2. The data lines PortData1 202 and PortData2 204 may be coupled to a corresponding upstream port of the USB interface, which is coupled to USB wires routed within the interior of the automobile to a downstream port of a USB host.

An overvoltage event, such as a 12V potential of an automobile battery is temporarily shorted to a USB line, may permanently damage the line and corresponding ports. Therefore, a method of protection may be required for the interface connections. For example, overvoltage protection may be needed at the USB in-dash receptacle where a USB peripheral device is plugged-in. Such a device, protection circuit 210, is shown in FIG. 2 and will be described in further detail shortly. Similar overvoltage protection may be required at the interface between the USB host downstream port and the USB wires routed to the in-dash USB receptacle both of which are not shown but would have a similar topology as that depicted in FIG. 2.

The overvoltage protection method may differ between the VBUS and Ground lines and the data lines due to different electrical characteristics. For example, protection for the VBUS line may be simpler than protection for the two data lines. Methods including a diode bridge, such as bridge 220, an integrated circuit containing a voltage reference and a comparator for overvoltage detection and correction in combination with a bulk capacitor, such as capacitor 226, for electrostatic discharge (ESD) correction have been used and are known to those skilled in the art. Similarly, a short circuit to the Ground line may occur or an over-current condition inside the peripheral device that is connected to the USB port. However, there are many protection devices already available that provide current limiting and fault reporting to a controller as required.

Protection of the data lines may be more difficult due to the USB 2.0 Specification for the high-speed (HS) data rate of 480 MBits/sec. At this speed the capacitance and inductance of the circuit board, connectors, and any additional circuitry becomes critical. These high-frequency capacitive and inductance effects make it difficult to provide low capacitance to minimize signal attenuation, a quick response to electrical surges and transients, and small packages to minimize footprint for space-constrained modules. In addition, in order to satisfy Test Points 2 and 3 defined in the USB 2.0 Specification the output of an overvoltage protection circuit may be required to meet the rise and fall times, signal levels, and pulse skew of a corresponding eye pattern diagram. Eye pattern diagrams, which may be displayed and measured on an oscilloscope, have long been primary tools for diagnosing signal-integrity problems that corrupt serial data in digital-communication systems.

One manner to protect a USB IC port, such as PortData1 202 and PortData2 204 in FIG. 2, may be to incorporate a variable-resistance device between the USB IC port and an external USB connector, such as ConnectorData1 230 and ConnectorData2 232, respectively. In one embodiment, the protection device is a quick-switch (Q-Switch), such as a MOSFET transistor, controlled by an overvoltage detector. During an overvoltage event, the detector disengages the Q-Switch.

In one embodiment, an NMOS transistor is used as a Q-Switch with its gate terminal used as a threshold detector, similar to simple Q-Switch level translation applications. When the voltage level on node A or node B reaches the threshold voltage of transistor 216 of FIG. 2, transistor 216 enters an ON state and, in one embodiment, may provide a low series resistance between the drain and source terminals, such as 1 to 2 ohms. This low series resistance value may be appreciably smaller than the impedance of the transmission line coupled to node A. For example, this transmission line may have a 90 ohm resistance and transistor 216 provides a low series resistance that is only 2.2% of this value.

Referring again to nmos transistor 216 of FIG. 2, if voltage levels on the USB lines 230 and 202 remain below Vline=Vdd−Vgs, or Vline=5V−Vgs, then transistor 216, or the Q-Switch, is in an ON state. Accordingly, transistor 216 is able to transmit USB signals in both directions. If the signal level on line 230 rises above the value Vout, then transistor 216 switches into open state, or an OFF state, with a high series resistance. As a result, the voltage on line 202 is not able to exceed the Vdd level, or 5V. If transistor 216 has a low gate-to-source threshold voltage level, such as below a 1.5V to 1.8V range, then protection circuit 210 is capable of transmitting low-speed (LS) and full-speed (FS) USB signal levels.

In order to transmit high-speed (HS) USB signal levels comprising a data rate of 480 MBits/sec, there may be several restrictions for the parameters of the Q-Switch, or transistor 216. First, transistor 216 should have a low series resistance (drain-to-source) value in the ON state. Second, transistor 216 should only introduce a small capacitance-to-ground value in the ON state. These two conditions may be necessary to maintain signal integrity of USB transmission in HS mode. In one embodiment, the necessary parameter ranges may be 1 to 2 ohms of series resistance and a maximum of 10 to 20 picoFarads (pF) of capacitance to ground. In addition, these parameter restrictions will aid in transistor 216 switching to an OFF state quickly enough so as not to expose the protected USB ports, which are coupled to lines 202 and 204, to high-voltage ringing associated with the short event.

As seen in FIG. 2 the drain and source terminals of transistor 216 are bypassed by a series RC chain, resistor 212 and capacitor 214, in order to prevent the circuit from excessive ringing when the switch is disengaged, or switches to an OFF state, in the presence of an inductive high-current source. In one embodiment, a suppression of ringing may occur with a 22 ohm resistor 212 and a 10 nF capacitor 214.

In order to minimize the loading effect of substantial parasitic gate and drain capacitance of transistor 216, resistor 218 is incorporated into protection circuit 210. The USB signal path flows from line 230 to transistor 218 to line 202, or vice-versa, since the USB signal path is bi-directional. Without resistor 218, the USB signal path may be shorted by the parasitic capacitances of transistor 218 to the gate terminal of transistor 218, or VBUS. For example, transistor 216 has a gate-to-drain parasitic capacitance, Cgd, between line 230 and the gate terminal. Also, transistor 218 has gate-to-source parasitic capacitance, Cgs, between line 202 and the gate terminal. The nomenclature may switch due to transistor 216 is a symmetric device and the USB signal path is bi-directional. If transistor 216 has a low drain-to-source series resistance, Rds, in the ON state, such as 1 to 2 ohms, as desired, then the two parasitic capacitances, Cgd and Cgs, appear in parallel between the gate terminal and the USB signal path.

A capacitor may easily passes high frequencies and appears to be a virtual short circuit to very high frequencies. Ohm's law applies to reactance, and the relationship for the root mean square (rms) current and voltage across a capacitor is Vrms=Xc*Irms. The reactance for a capacitor, Xc, which like resistance is measured in ohms, with C farads of capacitance to a current of frequency f hertz is Xc(f)=1/(2*pi*f*C). The capacitive reactance depends on frequency, and resultingly, the voltage and current likewise vary with frequency. A capacitor offers infinite reactance to a DC signal and nearly zero reactance to a very high frequency signal.

For example, generally speaking, a modern transistor, such as transistor 216 of protection circuit 210, that has a 1 ohm Rds value and is able to hold a 20V potential on its terminals typically has a 25 pF to 50 pF range for each of Cgs and Cgd. These high parasitic capacitance values for Cgs and Cgd in combination with a high-frequency signal, such as a high-speed USB signal of 480 Mbits/s, will create a low reactance from the USB signal path to the gate terminal of transistor 216. In this example, the capacitive reactance would be Xc=1/(2*pi*480 MHz*50 pF)=6.6 ohms. In contrast, the transmission line impedance of USB lines is typically 90 Ohms. The resultant shorting of the USB signal path to the gate terminal due to this small 6.6 ohm impedance will disrupt both the signal integrity of the USB signal path and a USB-IF high-speed eye pattern diagram test. If a transistor with a very low parasitic capacitance is chosen, then it would have a larger unacceptable Rds value and other USB tests would fail.

However, due to the insertion of resistor 218 in protection circuit 210, the 6.6 ohm impedance of the given example may be increased above the value of the USB line impedance since resistor 218 is in series with the capacitances Cgd and Cgs. For example, if resistor 218 is chosen to have a resistance of 330 ohms, then the resulting impedance of the capacitive reactance and resistor 218 is 6.6 ohms+330 ohms=336.6 ohms, or a value much higher than the 90 ohm USB line. In this case, the resulting impedance is more than three times greater than the transmission line impedance. Now the shunting effect is much smaller, and both the signal integrity of the USB line may be satisfactory and the USB-IF eye pattern diagram test may be satisfied.

Figure 3:
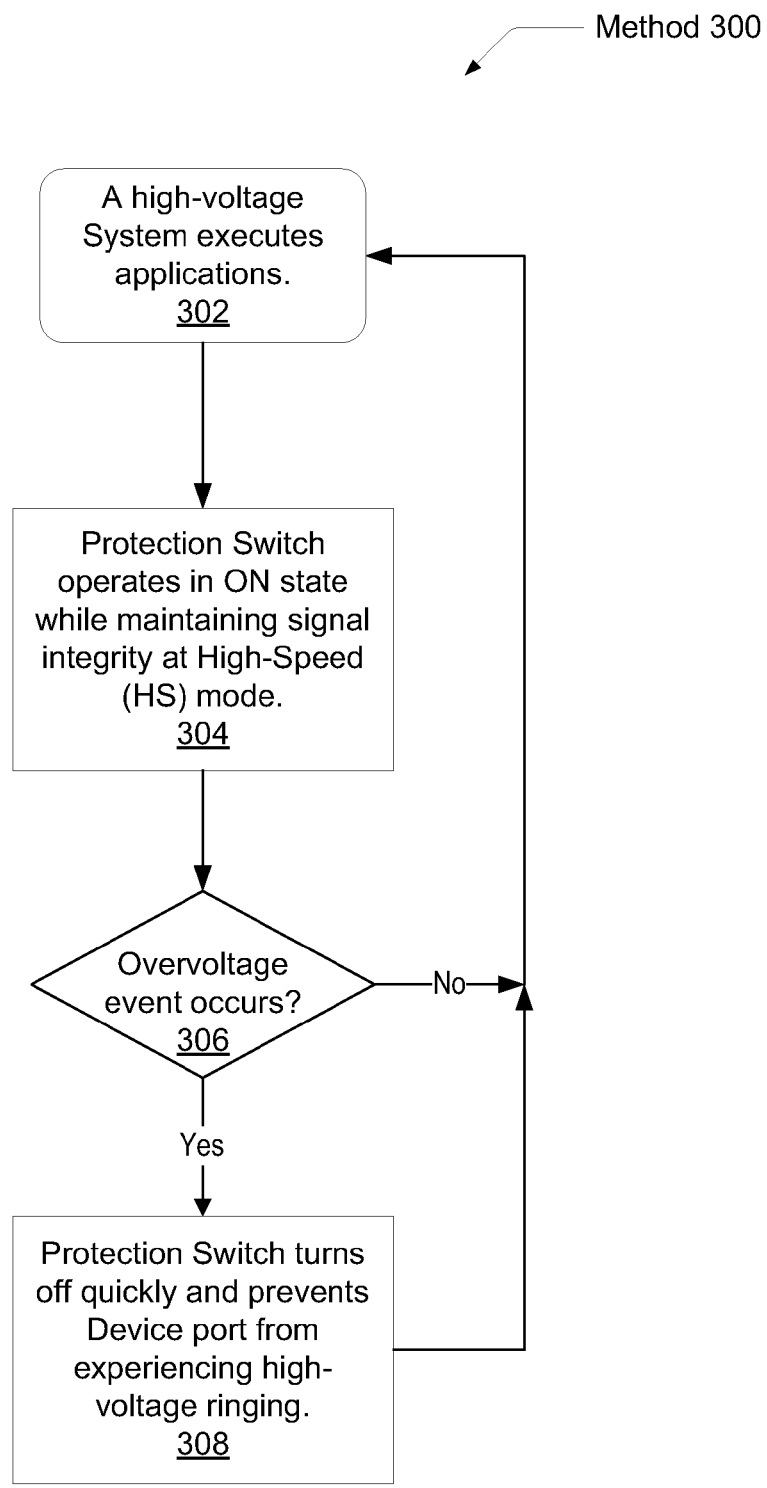
FIG. 3 is a generalized flow diagram illustrating one embodiment of a method for overvoltage protection for a data bus interface connected to a high-voltage system.

FIG. 3 illustrates a method 300 for overvoltage protection for a data bus interface connected to a high-voltage system. Method 300 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. In the embodiment shown, a high-voltage system is powered up and executes applications in block 302. In one embodiment, the high-voltage system is an automotive infotainment system with one or more USB ports that operate at lower voltages.

In block 304, a protection switch within the system operates in an ON state while maintaining signal integrity in a High-Speed (HS) data rate mode. In one embodiment, the protection switch is a nmos transistor, such as transistor 216 of protection circuit 210, utilized to connect a USB integrated circuit (IC) port to an external connector for a peripheral device. If an overvoltage event occurs, such as a USB wires shorting to a high potential of an automotive battery (conditional block 306), then in block 308 the protection switch quickly turns off in order to prevent damage to a USB IC port. For example, a wire-harness may be accidentally pierced during assembly and later cause shorts between the automotive 12V battery and the USB wires used in an infotainment system. A circuit such as protection circuit 210 may both protect USB IC ports while preserving formal conformance to USB-IF Eye Diagram tests in LS, FS, and HS modes.

Although the embodiments above have been described in considerable detail, numerous variations and modifications will become apparent to those skilled in the art once the above disclosure is fully appreciated. It is intended that the following claims be interpreted to embrace all such variations and modifications

What is claimed is:

1. An overvoltage protection circuit comprising:
a first node configured to send and receive signals;
a second node configured to send and receive signals, wherein the first node and the second node are connected by a transmission line and a series connection impedance, wherein the transmission line has an impedance and wherein the series connection impedance has an impedance that is less than five percent of the impedance of the transmission line and wherein the transmission line and series connection impedance are connected in parallel;
a third node coupled to a power supply, wherein the power supply is connected to a switching circuit of the protection circuit by a series resistor that has an impedance at least three times the impedance of the transmission line wherein the impedance of the series resistor prevents the power supply from shorting signals on the transmission line; and
the switching circuit configured to:
connect the first node and the second node in response to detecting a signal on either the first node or the second node that reaches a first threshold voltage;
transmit the signal through the impedance of the transmission line; and
disconnect the first node and the second node from one another, responsive to detecting the signal reaches a second threshold voltage above a power supply reference.

2. The overvoltage protection circuit as recited in claim 1, wherein the switching circuitry comprises only one nmos transistor having a drain terminal coupled to the first node and a source terminal coupled to the second node, wherein each of the first node and the second node transmits bidirectional signals.

3. The overvoltage protection circuit as recited in claim 2, wherein a combination of a frequency of the signal and an equivalent parasitic gate capacitance of the nmos transistor produces a gate capacitive reactance less than twenty percent of the transmission line impedance on the first node.

4. The overvoltage protection circuit as recited in claim 3, prevents electrical shorting of the transmitted signal to the third node through the gate capacitive reactance when the nmos transistor is in an on state.

5. The overvoltage protection circuit as recited in claim 4, wherein a series connection capacitance to ground is less than a parasitic capacitance.

6. The overvoltage protection circuit as recited in claim 5, wherein the switching circuitry is further configured to suppress signal ringing during said disconnect via a series resistor-capacitor chain between the first node and the second node.

7. The overvoltage protection circuit as recited in claim 5, wherein said signal is a Universal Serial Bus (USB) high-speed mode signal.

8. The overvoltage protection circuit as recited in claim 5, wherein said signal is a serial bus communication signal.

9. An interfacing system for providing overvoltage protection, the interfacing system comprising:
one or more input ports each configured to send and receive signals and each said input port connected to a corresponding output port by a transmission line and a series connection impedance, wherein the series connection impedance has an impedance that is less than five percent of the impedance of the transmission line and wherein the transmission line and the series connection impedance are connected in parallel;
a power supply;
an overvoltage protection circuit for each input port comprising a first node coupled to a corresponding input port, a second node coupled to a corresponding output port, and a third node coupled to the power supply, wherein the power supply is connected to the other components of the system via a series resistor that has an impedance at least three times the impedance of the transmission line; and
wherein the overvoltage protection circuit is configured to:
connect the first node and the second node in response to detecting a signal on either the first node or the second node that reaches a first threshold voltage;
transmit the signal through the impedance of the transmission line; and
disconnect the first node and the second node from one another, responsive to detecting the signal reaches a second threshold voltage above a power supply reference.

10. The interfacing system as recited in claim 9, wherein the overvoltage protection circuit comprises only one nmos transistor having a drain terminal coupled to the first node and a source terminal coupled to the second node, wherein each of the first node and the second node transmits bidirectional signals.

11. The interfacing system as recited in claim 9, wherein a combination of a frequency of the signal and an equivalent parasitic gate capacitance of the nmos transistor produces a gate capacitive reactance less than twenty percent of the transmission line impedance on the first node.

12. The interfacing system as recited in claim 11, wherein the series resistor prevents electrical shorting of the transmitted signal to the third node through the gate capacitive reactance when the nmos transistor is in an on state.

13. The interfacing system as recited in claim 12, wherein a series connection capacitance to ground is less than a parasitic capacitance.

14. The interfacing system as recited in claim 13, wherein the overvoltage protection circuit is further configured to suppress signal ringing during said disconnect via a series resistor-capacitor chain between the first node and the second node.

15. The interfacing system as recited in claim 13, wherein said signal is a Universal Serial Bus (USB) high-speed mode signal.

16. The interfacing system as recited in claim 13, wherein said signal is a serial bus communication signal.

17. An overvoltage protection method in a data bus interface, the method comprising:
receiving a signal on a first node;
connecting the first node and a second node by a transistor coupled to a transmission line, responsive to detecting a signal on either the first node or the second node that reaches a first threshold voltage, wherein the first node and a second node are additionally coupled by a series connection impedance that is less than five percent of a transmission line impedance on the first node;

transmitting the signal through the series connection impedance; and disconnecting the transmission line between the first node and the second node using the transistor, responsive to detecting the signal reaches a second threshold voltage above the power supply, wherein the power supply is connected to the transistor via a series resistor that has an impedance at least three times the impedance of the transmission line.

18. The method as recited in claim 17, wherein said transmitting the signal utilizes only one nmos transistor having a drain terminal coupled to the first node and a source terminal coupled to the second node, wherein each of the first node and the second node transmits bidirectional signals.

19. The method as recited in claim 18, wherein a combination of a frequency of the signal and an equivalent parasitic gate capacitance of the nmos transistor produces a gate capacitive reactance less than twenty percent of the transmission line impedance on the first node.

20. The method as recited in claim 19, wherein the series resistor prevents electrical shorting of the transmitted signal to the third node through the gate capacitive reactance when the nmos transistor is in an on state.

* * * * *